March 11, 1952  P. C. J. GILSON  2,588,515
REVERSIBLE ROLLER TYPE CLUTCH
Filed Dec. 22, 1945  2 SHEETS—SHEET 1
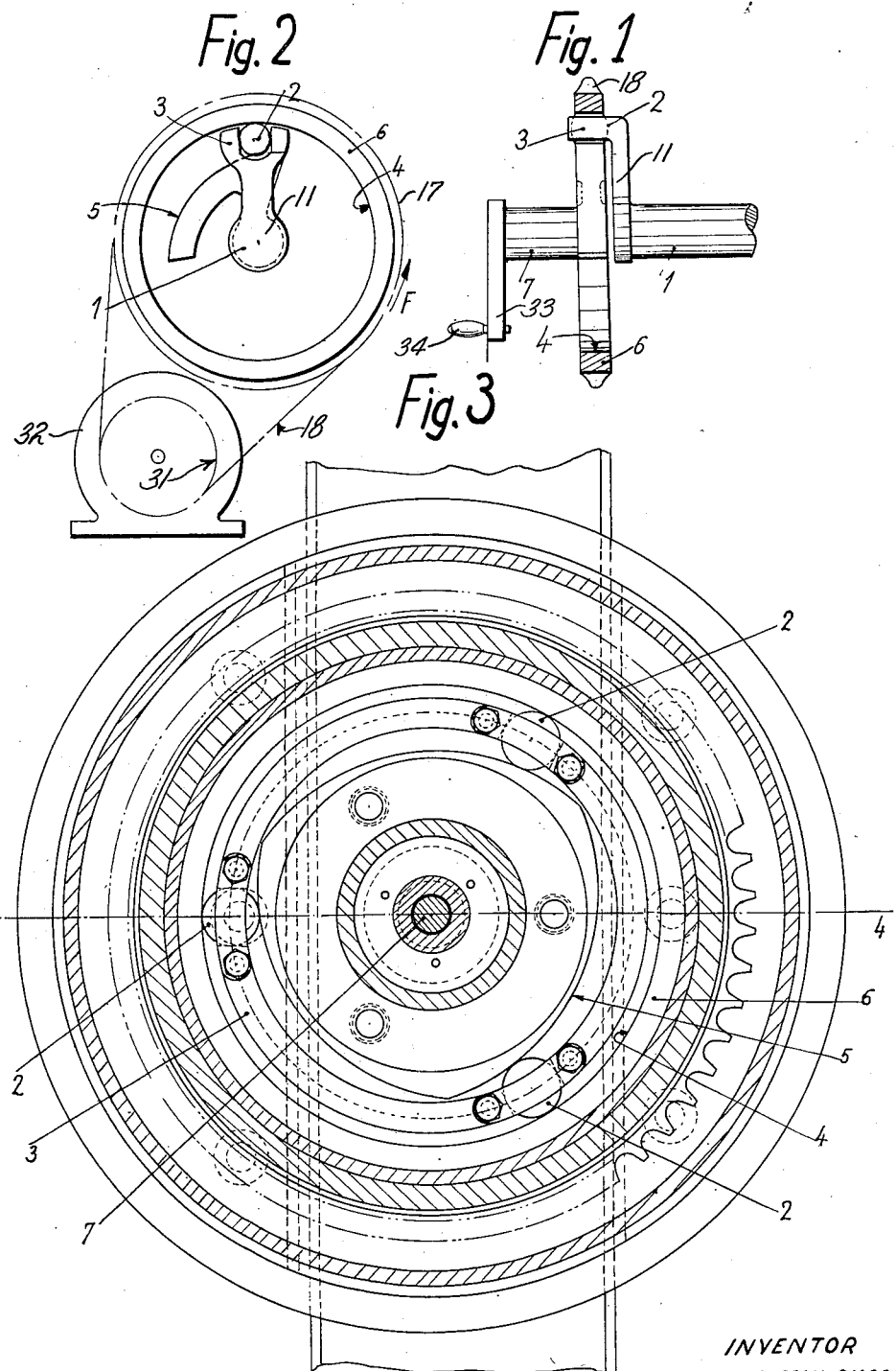
INVENTOR
PIERRE CHARLES JEAN GILSON
BY Otto Munk
HIS ATTY March 11, 1952    P. C. J. GILSON    2,588,515
REVERSIBLE ROLLER TYPE CLUTCH
Filed Dec. 22, 1945      2 SHEETS—SHEET 2

INVENTOR
PIERRE CHARLES JEAN GILSON
BY *Otto Munk*
HIS ATTY

Patented Mar. 11, 1952

2,588,515

UNITED STATES PATENT OFFICE 2,588,515

REVERSIBLE ROLLER TYPE CLUTCH

Pierre Charles Jean Gilson, Campagne-lez-Wardrecques, France

Application December 22, 1945, Serial No. 636,767
In France September 6, 1945

1 Claim. (Cl. 192—44)

The invention relates to a clutch of the roller type which is controlled in its operation by a pilot shaft that may have variable motion, in order to impart to a driven member, actuated through said clutch by a power or driving member having a uniform rotation, the same variable motion executed by the pilot member, care being taken that the rotation of the power or driving and driven members will have no reaction upon the movement of said pilot shaft.

Such a device may be applied to a great number of machines, instruments, etc., wherein the pilot member is or is controlled by a measuring or recording appliance and the receiving or driven member a mechanism including a secondary power and motion transmitting tool having a great inertia, and requiring the supply of a considerable amount of external power for the operation thereof.

It has already been suggested (see French Patent No. 559.955) to operatively connect a driving member and a driven member by a friction clutch, and to cause the frictional force to vary in response to the speed variations of a pilot member. However, the efficiency of such a device is unreliable, since its operation is based on the frictional properties of coacting surfaces, which vary considerably according to various factors (physical state and cleanliness of the surfaces, nature of the lubricant if any, temperature, atmospheric conditions, clearances, resilient deformations, etc.).

The invention has for its object to provide a clutch of the roller type affording a positive connection between the driving and driven members, thus improving the efficiency, stability and reliability of the device.

Further features of the invention will be made clear from the following description, with reference to the accompanying drawing, which shows, by way of example, an embodiment of the invention and in which:

Fig. 1 is a diagrammatical end view showing the principle of the invention;

Fig. 2 is a corresponding elevational view;

Fig. 3 is a cross-section through line 3—3 of Fig. 4 showing an embodiment of the invention.

Figure 4:
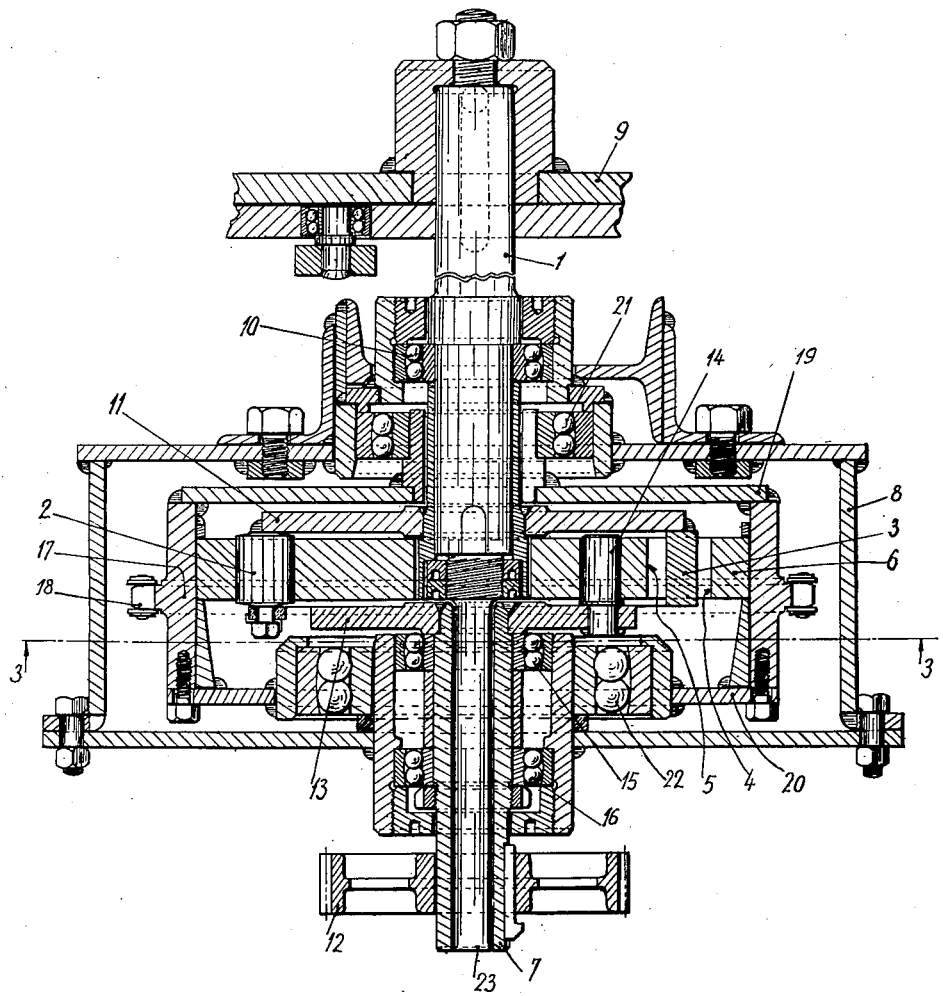
Fig. 4 is a cross-section through line 4—4 of Fig. 3.

Referring to diagrammatical Figs. 1 and 2, reference numeral 1 denotes a driven shaft having a lateral extension 11 ending in a fork 3 engaging a roller 2 arranged between the inner cylindrical surface 4 of an annular driving member 6 and a pilot cam member 5 secured to a pilot shaft 7.

If the clutch is to be operative in both directions of rotation, as shown, the operative surface of cam member 5 converges toward cylindrical surface 4 at both ends as shown.

The periphery of driving member 6 is formed for example with sprocket teeth 17 in mesh with a driving chain 18, engaging a sprocket 31 driven at a uniform angular speed by a source of power such as an electric motor 32. Said speed should be at least equal to the maximum angular speed that may be imparted to the pilot member and the power supplied by motor 32 should be at least equal to the power necessary for actuating the driven member.

Pilot shaft 7, in the example of Fig. 1, has secured thereto a crank 33, fitted with a handle 34.

The device operates as follows:

Assuming that pilot shaft 7 is rotated by handle 34 in the direction of arrow F, roller 2 is forced by cam 5 outwardly and engages cylindrical surface 4. Roller 2 is thus wedged between member 6 and cam 5 at one end of said cam and driven shaft 1 is clutched and rotated bodily with member 6.

Whenever the angular speed of driven shaft 1, imparted to the latter by driving member 6, tends to exceed that of pilot shaft 7 roller 2 tends to move toward the middle of cam 5, where the gap between said cam and cylindrical surface 4 is wider, said roller tends to become idle, and driven shaft 1 is unclutched and tends to slow down.

In fact, an infinity of successive clutching and unclutching movements take place, whereby driven shaft 1 receives a series of impulses, the instantaneous angular displacements of said shaft being identical with those of pilot shaft 7.

In the practical embodiment of the invention illustrated by way of example in Figs. 3 and 4, the same reference numerals indicate similar parts as in Figs. 1 and 2. For balancing purposes, three rollers 2, spaced at 120° from each other, are engaged in recesses of a cage 3 having the same function as the fork in Figs. 1 and 2, and cam 5, bodily rotatable with pilot shaft 7, comprises three bosses. The whole mechanism is enclosed within a tight casing 8, so as to operate in an oil bath.

Driven shaft 1, to which is secured the driven member or secondary power and motion transmitting tool 9 is mounted in a ball bearing 10 held in the casing and carries a flange 11 integrally connected to cage 3.

Pilot shaft 7 has keyed thereto a pinion 12 which may be operatively connected with a crank such as 33 (Fig. 1) or any other pilot mechanism imparting to said pilot shaft 7 a variable motion. Said shaft carries a disc 13 to which cam 5 is secured by means of three driving pins 14 for example. The pilot shaft is mounted in bearings 15 and 16 of the casing.

Driving member 6 is connected through a sprocket 17 and a chain 18 to a prime mover, rotating at a uniform speed as in Fig. 2. Sprocket 17 is secured to discs 19–20 which, by means of ball bearings 21 and 22, are centered within the casing without exerting any reaction on pilot shaft 7, the same being tubular and enclosing with a certain clearance a centering shank 23 of driven shaft 1.

The mechanical efficiency of the device approaches 98% and the power amplifying ratio (i. e. the ratio between the torque of the driven shaft and the torque of the pilot shaft) can easily reach 100:1. This amplifying power is due to the fact that, assuming that the angular velocity of the pilot be the same as that of the driving member, if there is an increase in the angular speed of said pilot, the roller tends to be further wedged and undergoes an elastic deformation under the pressure exerted by the crown, whereby the unit comprising the crown the roller and the pilot forms so to speak an integral unit which is practically rotated under the effect of the driving torque of the crown.

The torque which is to be supplied by the pilot for maintaining this wedging condition can evidently be kept small as compared with the driving torque of member 6, and this is more true as the angle of the tangents to the roller with the crown and the pilot is small.

It will be understood that the invention is not limited to the constructional details hereinabove described which have been given only by way of example.

Having now described my invention what I claim as new and desire to secure by Letters Patent is:

A clutch device adapted to transmit power and motion from a prime mover to a secondary power and motion transmitting tool, which comprises: a driving member mounted about a central axis and having an inner circular operative surface; a prime mover for imparting to said driving member around said axis a rotary motion at a uniform angular speed; a pilot member mounted on a first rotary shaft separate from, and coaxial with, said driving member; actuating means connected with said pilot member, adapted to impart thereto a variable angular speed; at least one cam member integrally connected to said pilot member and having its effective cam surface inside said inner circular operative surface; a driven member mounted on a second rotary shaft coaxial with and separate from said driving member and first shaft, said driven member actuating said secondary power and motion transmitting tool; at least one roller in constant engagement with said driven member and freely movable radially thereof, said roller being disposed between the inner surface of said driving member and the effective surface of said cam; the profile of the effective surface of said cam relative to said inner circular operative surface being such as to wedge said roller between said surfaces when the relative motion of said pilot member and cam to said circular operative surface occurs in one direction and to free said roller when said relative motion occurs in the opposite direction, said relative motions being instantaneous and successive; the uniform angular speed of said driving member being at least equal to the maximum value of the variable angular speed of said pilot and cam members.

PIERRE CHARLES JEAN GILSON.

REFERENCES CITED

The following references are of record in the file of this patent:

UNITED STATES PATENTS

| Number | Name | Date |
|---|---|---|
| 879,016 | Starr | Feb. 11, 1908 |
| 1,607,222 | Wallgren | Nov. 16, 1926 |
| 2,306,233 | Smith | Dec. 22, 1942 |

FOREIGN PATENTS

| Number | Country | Date |
|---|---|---|
| 685,181 | Germany | Dec. 13, 1939 |
| 595,249 | France | Sept. 29, 1925 |
| 745,209 | France | May 8, 1933 |